United States Patent
Prieto et al.

(10) Patent No.: US 8,339,474 B2
(45) Date of Patent: Dec. 25, 2012

(54) GAIN CONTROLLED THRESHOLD IN DENOISING FILTER FOR IMAGE SIGNAL PROCESSING

(75) Inventors: Yolanda Prieto, Coral Gables, FL (US);
Miles A. Sakauye, Mesa, AZ (US);
Yong Yan, Austin, TX (US); Arnold W. Yanof, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 759 days.

(21) Appl. No.: 12/194,697

(22) Filed: Aug. 20, 2008

(65) Prior Publication Data
US 2010/0045820 A1 Feb. 25, 2010

(51) Int. Cl.
*H04N 5/235* (2006.01)
*H04N 5/335* (2011.01)
*H04N 3/14* (2006.01)
*G06K 9/40* (2006.01)

(52) U.S. Cl. ............... 348/229.1; 348/230.1; 348/300; 348/222.1; 348/294; 382/255; 382/260

(58) Field of Classification Search ............... 348/241, 348/216.1, 222.1, 229.1–230.1, 294, 300–324; 382/255, 260–265, 274
See application file for complete search history.

(56) References Cited

U.S. PATENT DOCUMENTS

| | | | |
|---|---|---|---|
| 3,971,065 A | | 7/1976 | Bayer |
| 5,530,474 A | * | 6/1996 | Takei .................... 348/224.1 |
| 7,136,095 B2 | | 11/2006 | Patej |
| 7,206,455 B1 | * | 4/2007 | Hatipoglu ................. 382/240 |
| 2002/0027604 A1 | * | 3/2002 | Hung ........................ 348/239 |
| 2004/0234153 A1 | * | 11/2004 | Nakami ..................... 382/254 |
| 2005/0036707 A1 | * | 2/2005 | Matsuura ................... 382/275 |
| 2008/0225147 A1 | * | 9/2008 | Dakemoto et al. ........... 348/300 |
| 2010/0328544 A1 | * | 12/2010 | Hendrickson et al. ........ 348/726 |

* cited by examiner

*Primary Examiner* — Aung S Moe
*Assistant Examiner* — Chia-Wei A Chen
(74) *Attorney, Agent, or Firm* — Gary Stanford

(57) ABSTRACT

An image processing system is disclosed which uses gain information from an input image to determine a threshold value used to filter the input image. The gain information is indicative of the amount of illumination of the input image and thus the noise level. The image processing system includes an image processor, a converter and a filter. The image processor receives and processes first image information into second image information and extracts the gain information from the first image information. The converter converts the gain information into a filter threshold, which is used by the filter to filter the second image information to provide filtered image information. The converter may include a lookup table storing noise characteristic estimates or the threshold values. The threshold values may further be based on subband size. The filter may be a wavelet-based transform denoising filter.

20 Claims, 3 Drawing Sheets

| LIGHT LEVEL (LUX) | $G_R$ | $G_{GR}$ | $G_{GB}$ | $G_B$ | $G_T$ | GAMMA ($\gamma$) | SEL |
|---|---|---|---|---|---|---|---|
| 500 | 4.75 | 3.25 | 3.25 | 4.125 | 3.80 | 1 | 0 |
| 400 | 6.125 | 4.125 | 4.13 | 5.25 | 4.85 | 1 | 0 |
| 300 | 8.375 | 5.75 | 5.75 | 7.25 | 6.71 | 1 | 0 |
| 200 | 11.75 | 8.125 | 8.13 | 10.125 | 9.44 | 2 | 1 |
| 100 | 11.875 | 15.875 | 15.88 | 10.375 | 14.05 | 3 | 1 |
| 75 | 29.75 | 20.75 | 20.75 | 26.5 | 24.11 | 5 | 1 |
| 50 | 47.625 | 33.375 | 33.38 | 42.375 | 38.68 | 8 | 1 |
| 25 | 46.125 | 60.5 | 60.5 | 39.375 | 53.78 | 12 | 1 |
| ⋮ | ⋮ | ⋮ | ⋮ | ⋮ | ⋮ | ⋮ | ⋮ |

300

GAIN CONTROLLED THRESHOLD IN DENOISING FILTER FOR IMAGE SIGNAL PROCESSING

BACKGROUND OF THE INVENTION

1. Field of the Invention

The present invention relates in general to image noise reduction, and more specifically to a gain controlled threshold in a denoising filter for image signal processing.

2. Description of the Related Art

Noise reduction is a key component in any imaging system. Noise filtering may be applied at various steps of an image signal processing (ISP) chain. In post-processing, at the output of the ISP chain, denoising reduces any residual noise prior to encoding. Noise in the image is caused by many factors including noise generated by the sensor and in the ISP chain. In conventional configurations, external manual control by the user was used to adjust parameters in the processing chain including those associated with denoising filters. When a conventional image processing system was used within a handheld camera, for example, the user made external adjustments in an attempt to improve the quality of the image displayed on the camera monitor. Such subjective manual adjustment was inconvenient, time-consuming, and error prone often resulting in less than optimal image quality.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
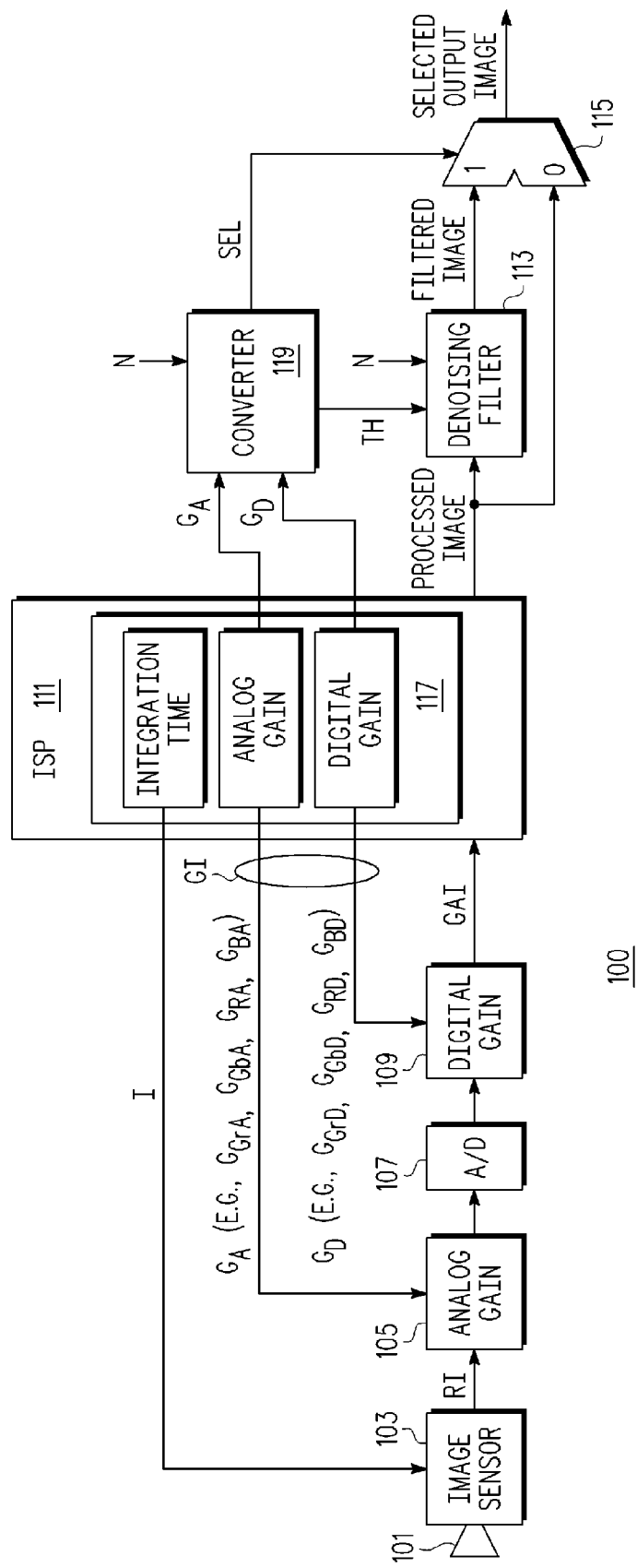
FIG. 1 is a simplified block diagram of an image processing system implemented according to an exemplary embodiment, which applies a gain controlled threshold value (TH) in a denoising filter to reduce noise and increase quality of processed images.

FIG. 1 is a simplified block diagram of an image processing system 100 implemented according to an exemplary embodiment, which applies a gain controlled threshold value (TH) in a denoising filter 113 to reduce noise and increase quality of processed images. Input light signals are focused by a lens 101 onto an image sensor 103. The image sensor 103 is any suitable type of device for sensing an image or video as known to those skilled in the art, such as a CMOS (complementary metal oxide semiconductor) array or CCD (charged-coupled device) array or the like. The image sensor 103 outputs raw image (RI) information, which is provided to an input of an analog gain circuit 105. The image sensor 103 typically has a maximum resolution capability although the resolution of the system may be reduced so that the RI information has a lower resolution. The analog gain circuit 105 amplifies the RI information and provides amplified image information to an input of an analog to digital (A/D) converter 107. The A/D converter 107 digitizes the analog image information and provides digital image information to an input of a digital gain circuit 109. The digital gain circuit 109 digitally amplifies the digital image information and provides gain adjusted image (GAI) information to an input of an image signal processor (ISP) circuit 111. The ISP circuit 111 performs various signal processing functions on the GAI information for ultimately providing a processed image signal to an input of the denoising filter 113 and to one data input of a two-input multiplexer (MUX) 115. The output of the denoising filter 113 provides a filtered image signal to the other data input of the MUX 115, having its output providing a selected output image signal. The MUX 115 receives a select signal SEL at its select input. Thus, one of the processed image and filtered image signals are selected as the output image. The output image may be provided to a camera monitor or the like (e.g., liquid crystal display or LCD monitor or the like, not shown), or may be stored, or otherwise may be encoded depending upon the particular configuration.

The ISP circuit 111 evaluates the GAI information and adaptively adjusts the integration time (I) and gain information (GI) stored in a memory 117. In the embodiment shown, the gain information GI includes an analog gain ($G_A$) and a digital gain ($G_D$). The adjusted integration time I is fed back to the image sensor 103 to adjust the amount of time for which the image sensor 103 is exposed per image frame. The integration time I is inversely related to the number of frames per second (fps) as I=1/fps, which determines the amount of light provided to the image sensor 103 per frame. In low light conditions, for example, the integration time I may be increased by the ISP circuit 111 to reduce the frame rate and expose the image sensor 103 for longer periods of time per frame. The ISP circuit 111 further adjusts the analog gain $G_A$ applied by the analog gain circuit 105 and adjusts the digital gain $G_D$ applied by the digital gain circuit 109. In this manner, the I, $G_A$, and $G_D$ signals are adjusted in a feedback loop for automatic exposure and gain adjustment of the input image. The integration time I is not considered part of the gain information GI although it may affect the amount of gain applied. For example, in lower light conditions the integration time I may be increased to increase the amount of light to the image sensor 103 which enables reduction of the amount of gain applied to the input image. It is noted, however, that it may be desired to keep the integration time I as small as possible in an effort to keep the frame rate as high as possible to avoid other problematic issues, such as blurring of the image. The ISP circuit 111 increases the analog gain $G_A$ and the digital gain $G_D$ in an attempt to achieve the desired gain level.

It is appreciated by those skilled in the art that noise is introduced into the image signal at various stages of the image processing system 100. It has been determined that the noise level is a function of various factors, including factors associated with the image sensor 103 (e.g., type, resolution, quality, etc.), the level of illumination ("lux" level) of the input image, image color factors, image frequency factors, the amount of analog gain (noise level increases with increased analog gain), quantization error in the A/D converter 107, amount of digital gain (noise level increases with increased digital gain), noise internally generated by processing within the ISP circuit 111, etc. In this manner, the processed image at the output of the ISP circuit 111 contains a certain level of noise. Depending upon the quality of the processed image signal, the denoising filter 113 filters the processed image to provide a filtered image with a reduced amount of noise to provide an improved image.

It has been determined that the gain information, including the analog gain $G_A$ and the digital gain $G_D$, may be used to provide an appropriate threshold value TH applied to the denoising filter 113 to reduce noise and improve image quality. As shown, the analog gain $G_A$ and the digital gain $G_D$ are provided to respective inputs of a converter circuit 119. The converter circuit 119 outputs the threshold value TH to the denoising filter 113 based on the gain information provided by the ISP circuit 111. The denoising filter 113 filters the processed image based on the provided threshold value TH to provide the filtered image at optimized image quality. When the gain information indicates that the quality of the processed image signal at the output of the ISP 111 is relatively high or otherwise adequate such that filtering is not necessary, then the denoising filter 113 may be bypassed. In one embodiment, for example, certain levels of the threshold value corresponding to minimal filtering such that denoise filtering is unnecessary or otherwise not desired. For example, if the processed image quality is sufficiently high, additional denoise filtering may actually depreciate image quality (e.g., cause image blurring and the like). In the illustrated embodiment, the converter circuit 119 provides a select (SEL) signal which is provided to a select input of the MUX 115 for selecting between the processed image signal and the filtered image signal. For example, certain levels of the threshold value TH indicate that filtering is desired so that the converter circuit 119 asserts the SEL signal to select the filtered image signal. If the threshold value TH indicates that filtering is not desired or otherwise unnecessary, then the converter circuit 119 asserts the SEL signal to select the processed image signal to bypass filtering.

It has been determined that the level of illumination of the input image has a relatively high impact on the noise level of the processed image. In optimal light conditions when sufficient light illuminates the subject being captured within the image, the gain levels and amount of processing is minimized so that the relative noise level of the image is reduced. In lower light conditions with low levels of illumination, however, gain levels are increased, and additional processing noise is introduced resulting in relative high noise level of the processed image. In one embodiment, the gain values $G_A$ and $G_D$ are mapped to a particular lux level or range of lux levels of the input image. In one embodiment, a lux level greater than or equal to a particular lux threshold (LTH) indicates that filtering is not necessary or otherwise not desired. For example, denoise filtering may blur an image with a relatively high illumination (e.g., $\geq$LTH lux). In this case, when the lux level is less then LTH, then denoise filtering using the threshold value TH is applied to the image. In a more specific embodiment, LTH=300.

In one embodiment, the RI information is in the form of raw Bayer data as understood by those skilled in the art in which raw Bayer data includes red, green and blue color components. It is noted that alternative input image data formats other than the Bayer pattern are contemplated including those currently available and those newly developed in the future. The Bayer pattern is used for purposes of illustration.

In the Bayer image configuration, the GAI information is a gain adjusted Bayer image. According to the Bayer image configuration, every other pixel row of each frame includes red and green color components (e.g., RGRGRG . . . ) and the remaining alternating rows include blue and green color components (e.g., GBGBGB . . . ). In this manner, the raw Bayer data includes four separate color component channels, including a Gr channel for green components in each red/green row, a Gb channel for green components in each green/blue row, an R channel for the red components and a B channel for the blue components. In this case the analog gain $G_A$ includes four separate analog gain values including two green analog gain values $G_{GrA}$ and $G_{GbA}$, a red analog gain component $G_{RA}$, and a blue analog gain component $G_{BA}$. Similarly, the digital gain $G_D$ includes four corresponding digital gain values including two green digital gain values $G_{GrD}$ and $G_{GbD}$, a red digital gain component $G_{RD}$, and a blue digital gain component $G_{BD}$. The integration time I is fed back to the image sensor 103 to adjust the frame rate as previously described. The four analog gain values are fed back to adjust four different analog gain channels within the analog gain circuit 105 associated with the four color components, respectively. Likewise, the four digital gain values are fed back to adjust four different digital gain channels within the digital gain circuit 109 associated with the four color components, respectively.

The gain adjusted Bayer image includes several gain values including a gain value for red components according to the following equation (1):

$$G_R=G_{RA}*G_{RD}, \qquad (1)$$

a gain value for blue components according to the following equation (2):

$$G_B=G_{BA}*G_{BD}, \qquad (2)$$

a gain value for green components in red rows according to the following equation (3):

$$G_{Gr}=G_{GrA}*G_{GrD}, \qquad (3)$$

and a gain value for green components in blue rows according to the following equation (4):

$$G_{Gb}=G_{GbA}*G_{GbD}, \qquad (4)$$

in which an asterisk "*" denotes multiplication. In one embodiment, the separate green components $G_{Gr}$ and $G_{Gb}$ are averaged to provide a general gain value for green components in the image according to the following equation (5):

$$G_G=(G_{Gr}+G_{Gb})/2 \qquad (5)$$

The gain values $G_R$, $G_B$, and $G_G$ may then be used to determine a total gain value $G_T$ according to the following equation (6):

$$G_T=(77*G_R+150*G_G+29*G_B) \qquad (6)$$

The total gain $G_T$ is associated with the conversion to luma components (Y) as noted below in which the individual color components are weighted relative to each other. The coefficients 77, 150, and 29 are exemplary only and other coefficients may be used depending upon various factors, such as the particular implementation, equipment, data sensors, input image format, etc.

The threshold TH may further be determined by a subband size N for wavelet-based filtering. In a wavelet decomposition for 3 levels, each time a level of transformation or decomposition is performed, the resulting transformed data results in a subband. The initial subband size is based on the largest of the two dimensions of the image sensor 103. For each decomposition, the dimension is divided by two so that the resulting subband size is divided by four for each progressive wavelet level for 2-D wavelet decomposition. For example, a 3 megapixel image has the dimensions of 2048×1536 in which the initial or (high frequency) subband size is N=2048/2=1024. The decomposition level 2 of the 3 megapixel image has a subband size of N=512 and the decomposition level 3 has a subband size of 256. In the case of a high definition (HD) image of 1920×1080, the values of N are N=960 for the first level decomposition, N=480 for the second level decomposition, N=240 for the third level decomposition, and so on. The subband size N, therefore, is determined by the image resolution and the decomposition level, where the image resolution and decomposition level may be provided by the camera or other equipment incorporating the image processing system 100. The subband size N may be conveyed internally by mapping resolution or may otherwise be user-defined. The subband size N is also shown provided to the denoising filter 113.

The image processing system 100 may be implemented as any combination of hardware and software. In one embodiment, the image sensor 103, the analog and digital gain circuits 105 and 109, the A/D converter 107 and the ISP circuit 111 are implemented in hardware. The memory 117 may be implemented using any suitable type of memory device, such as random access memory (RAM), double data rate (DDR) memory, synchronous dynamic RAM (SDRAM), embedded DRAM (EDRAM), synchronous RAM (SRAM), registers, etc. In one embodiment, the integration time and each gain value is stored and updated within a register and fed back to the gain blocks and the gain values are forwarded to the converter 119. The converter 119 and the denoising filter 113 may also be implemented as any combination of hardware and software depending upon the particular configuration. In one embodiment, the converter 119 includes a memory including a lookup table which provides the SEL and TH values based on the combination of the $G_A$ and $G_D$ values received from the ISP circuit 111. In one embodiment, the values stored in the lookup table are determined empirically for a given type of image sensor. For example, a series of images with various lighting conditions are processed through the image processing system 100 during off-line experimentation to vary the I, $G_A$ and $G_D$ values across respective ranges and the TH level providing the best filtered image is stored.

Figure 2:
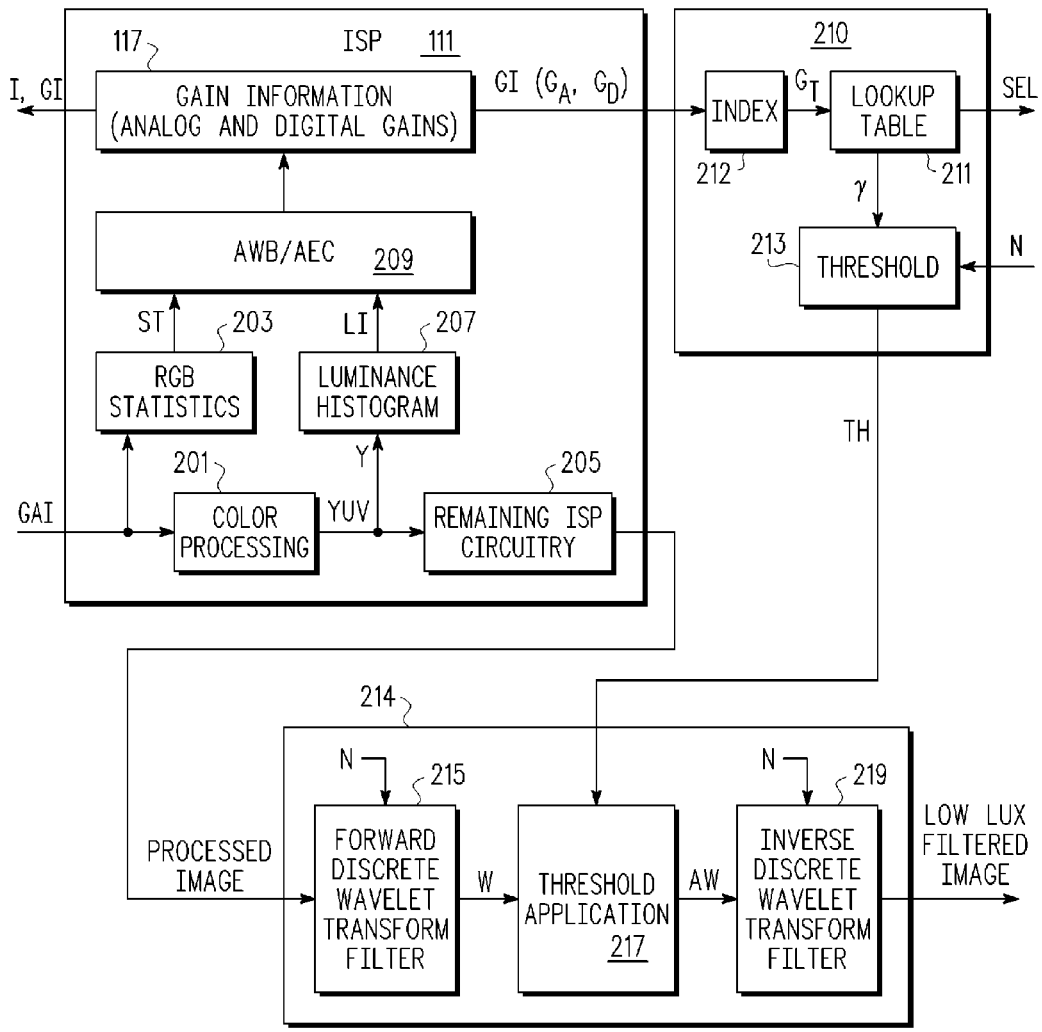
FIG. 2 is a block diagram providing additional details of the ISP circuit coupled to a converter and a denoising filter implemented according to an exemplary embodiment.

FIG. 2 is a block diagram providing additional details of the ISP circuit 111 coupled to a converter 210 and a denoising filter 214 implemented according to an exemplary embodiment. The converter 210 illustrates an exemplary embodiment of the converter 119 and the denoising filter 214 illustrates and exemplary embodiment of the denoising filter 113. The GAI information is provided to an input of a color processing circuit 201 and to an input of an RGB statistics circuit 203. The color processor circuit 201 incorporates various color processing functions, such as, for example, a demosaicing function, gamma color correction, color space conversion (CSC), etc. The demosaicing function interpolates the RG and GB components into RGB components or pixels as understood by those skilled in the art. The color space conversion converts the RGB components into luma (Y) and chrominance (UV) components. The luma component Y is provided to a luminance histogram circuit 207, and the YUV components are provided to remaining ISP circuitry 205 for further ISP processing as understood by those skilled in the art. The remaining ISP circuitry 205 provides the processed image to the input of the denoising filter 214. The RGB statistics circuit 203 determines average values, minimum values, maximum values, etc. of the RGB color components of the GAI information and provides statistical information ST to an input of an automatic white balance and automatic exposure control (AWB/AEC) circuit 209. The luminance histogram circuit 207 determines and provides light intensity (LI) information to another input of the AWB/AEC circuit 209. In the illustrated embodiment, the LI information is in the form of a luminance histogram which identifies the number of pixels or components at each of a spectrum of light intensity levels. The AWB/AEC circuit 209 uses the RGB statistics ST and the LI information to calculate appropriate values for the integration time and individual gain values of the gain information GI. The AWB/AEC circuit 209 updates the integration time and the analog and digital gain components stored within the memory 117, which outputs the updated integration time to the image sensor 103, and which outputs the gain information GI to the analog and digital gain circuits 105 and 109, and the converter 210 as previously described.

In the illustrated embodiment, the gain information GI is provided to an index circuit 212 which converts the gain information GI received from the ISP 111 to the total gain value $G_T$. The gain value GT is used as an index provided to an input of a lookup table 211 storing noise characteristic estimates or gamma (γ) values and corresponding SEL values. In one embodiment, the gamma values γ stored in the lookup table 211 are a function of the gain values determined according to the equations (1)-(4) previously described according to the following equation (7):

$$\gamma = f\{G_{Gr}, G_{Gb}, G_B, G_R\} \quad (7)$$

As noted above, the total gain $G_T$ is determined from these values and used as an index to map to the corresponding gamma value. The index circuit 212 may be implemented in any of many different ways. In one embodiment, for example, the index circuit 212 calculates the individual component gain values according to the equations 1-4, averages the green gain values according to equation (5), and then calculates the total gain according to equation (6). The selected gamma value γ is provided to one input of a threshold circuit 213 which receives the subband size N at another input and which provides the threshold value TH at its output. In one embodiment, the threshold value TH is calculated according to the following equation (8):

$$TH = \gamma \sqrt{2\log_2 N} \quad (8)$$

in which the square-root function is the Donoho threshold value understood by those skilled in the art and N in the subband size as previously described. In an alternative embodiment, the converter 119 is a lookup table directly mapping the gain information GI to the threshold values in which the subband size N is used as part of the input index rather than to a separate threshold circuit.

In the illustrated embodiment, the denoising filter 214 is implemented as a wavelet-based denoising filter including a forward discrete wavelet transform filter 215, a threshold application circuit 217, and a inverse discrete wavelet transform filter 219. In this case, the processed image is provided to an input of the forward discrete wavelet transform filter 215, which receives the subband size N via another input and which outputs a series of wavelet (W) values collectively forming a wavelet transform representation of the processed image. The wavelet values W are provided to an input of the threshold application circuit 217, which receives the threshold value TH via another input and which provides adjusted wavelet values AW to an input of the inverse discrete wavelet transform filter 219. The inverse discrete wavelet transform filter 219 converts the adjusted wavelet values AW into the low lux filtered image. In one embodiment, the threshold application circuit 217 replaces each of the wavelet values AW that are less than the threshold value TH with a corresponding zero (0) value. The wavelet values W that are equal to or greater than the threshold value TH pass through the threshold application circuit 217 unmodified. As understood to those skilled in the art, the forward and inverse discrete wavelet transforms can be implemented as separable transforms, or as 2-Dimensional transformation, or as a filter bank.

Figures 3, 4:
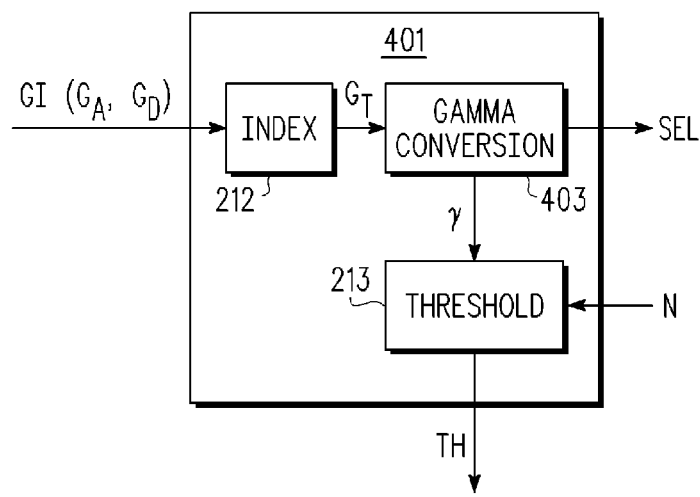
FIG. 3 shows a table mapping the light levels (lux), the individual color component values $G_R$, $G_{Gr}$, $G_{Gb}$, and $G_B$, and the corresponding total gain $G_T$ with the corresponding gamma (γ) and select SEL values.
FIG. 4 is a block diagram illustrating a converter implemented according to an alternative embodiment of the converter of FIG. 2 which may be used as the converter of FIG. 1.

FIG. 3 shows a table 300 mapping the light levels (lux), the individual color component values $G_R$, $G_{Gr}$, $G_{Gb}$, and $G_B$, and the corresponding total gain $G_T$ with the corresponding gamma value γ and select SEL values. In one embodiment, the amount of gamma is empirically determined at each of different light levels. The total gain calculation is then used to determine the corresponding location within the table 300. In one embodiment, if the actual determined total gain value falls between values in the table, the actual gamma value may be determined by interpolation. For example, if the total gain is about 19, then the gamma value is about 4. When the light level is at or above 300 lux corresponding to a total gain of about 6.7 or less, then the gamma value is one (1) and denoise filtering is bypassed. As shown, the SEL value for 300 lux or more is "0" indicating selection of the processed image rather than the filtered image. When the light level is low such as below 300 lux, then the gamma value is greater than one and denoise filtering is selected. As shown, the SEL value for light level less than 300 lux is "1" so that the filtered image is selected. It is noted that subband size N may be incorporated into the table 300 and that gain may also be mapped directly to the threshold value rather than to gamma values.

FIG. 4 is a block diagram illustrating a converter 401 implemented according to an alternative embodiment of the converter 210 which may be used as the converter 119. It has been determined that the total gain $G_T$ divided by the corresponding gamma value γ is relatively constant for certain configurations. The values of total gain $G_T$ divided by the corresponding gamma values γ from table 300, for example, results in a relatively constant value between about 4.48 and 4.84 having an average value of about k=4.71. Thus, the lookup table 211, may be replaced with a gamma conversion circuit 403 which divides the total gain $G_T$ from the index circuit 212 by the determined constant k to provide the gamma value γ. In another embodiment, the index circuit 212 may be incorporated into the gamma conversion circuit 403 providing a direct conversion between the gain information GI and the gamma value γ. As before, the gamma γ is provided to the threshold circuit 213 to determine the corresponding threshold value TH. In another embodiment, the conversion circuit 119 may be implemented as an arithmetic calculation circuit which converts the gain information GI directly to the gamma value γ and which converts the gamma value γ into the corresponding threshold value TH based on the provided subband size N. The gamma conversion circuit 403 also determines the appropriate value for SEL, such as by setting SEL=0 when the total gain $G_T$ is less than or equal to another constant value L and otherwise setting SEL=1. For example, as shown in table 300, L has a value of approximately 6.71. Thus, for values shown in the table 300, SEL=0 when the total gain is less than or equal to 6.71 and SEL=1 when total gain is above 6.71. The converter 401 has the advantage of replacing the memory circuitry implementing the lookup table 211 with a relatively simple arithmetic calculation circuit.

An image processing system according to one embodiment includes an image processor, a converter and a filter. The image processor receives first image information, processes the first image information into second image information, and extracts gain information from the first image information. The converter converts the gain information into a filter threshold. The filter filters the second image information using the filter threshold to provide filtered image information. The gain information is indicative of the amount of illumination of the first image information and thus the noise level of the input image. The gain information may include analog and digital gain information.

The converter may further provide a select value based on the gain information, where the select value is used to select between the second image information and the filtered image information. The second image information may be selected when the gain information indicates sufficient illumination. The converter may be a lookup table storing a filter threshold values based on the gain information. The converter may alternatively be a lookup table storing a noise characteristic estimates based on the gain information and a threshold circuit. The threshold circuit multiplies a selected noise characteristic estimate from the lookup table by a multiple based on a subband size to provide the filter threshold. The converter may alternatively be an arithmetic calculation circuit which converts the gain information into a total gain, and which converts the total gain into a noise characteristic estimate. Alternatively, the arithmetic calculation circuit may directly convert to the filter threshold.

The filter may be a wavelet-based denoising filter. In one embodiment, the filter includes a forward discrete wavelet transform filter, a threshold circuit, and an inverse discrete wavelet transform filter. The forward discrete wavelet transform filter provides wavelet values, the threshold circuit receives the wavelet values and provides adjusted wavelet values, and the inverse discrete wavelet transform filter receives the adjusted wavelet values and provides the filtered image information.

A method of processing image information according to one embodiment includes processing first image information into second image information, determining gain information from the first image information during processing, converting the gain information into a filter threshold, and filtering the second image information using the filter threshold to provide filtered image information.

The method may include selecting the filtered image information when the gain information indicates an illumination level below a predetermined illumination threshold, and selecting the second image information when the gain information indicates an illumination level above the predetermined threshold. The method may include providing the gain information to a lookup table storing filter thresholds. The method may include providing the gain information to a lookup table storing gamma values, and determining the filter threshold based on a selected gamma value and a subband size. The method may include determining a total gain value from the gain information and converting the total gain value into a gamma value.

The method may include transforming the second image information into wavelet values, replacing wavelet values less than the filter threshold with a zero value and otherwise passing the wavelet values to provide adjusted wavelet values, and transforming the adjusted wavelet values into the filtered image information.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An image processing system, comprising:
an image processor which receives first image information amplified using first gain information, which processes said first image information into second image information, which extracts second gain information from said first image information, and which updates said first gain information using said second gain information to provide updated gain information;
a converter which converts said updated gain information into a filter threshold; and
a filter which filters said second image information using said filter threshold to provide filtered image information.

2. The image processing system of claim 1, wherein said updated gain information comprises analog and digital gain information.

3. The image processing system of claim 1, wherein said image processor comprises:
a statistics circuit which determines color component statistics from said first image information;
a color processing circuit which determines luminance information from said first image information;
a luminance circuit which determines light intensity information from said luminance information; and
a white balance and exposure control circuit which uses said color component statistics and said light intensity information to update said first gain information.

4. The image processing system of claim 1, further comprising:
said converter further providing a select value based on said updated gain information;
select logic which selects between said second image information and said filtered image information based on said select value; and
wherein said select value causes said select logic to select said filtered image information when said gain information indicates an illumination level below an illumination threshold.

5. The image processing system of claim 1, wherein said converter comprises a lookup table storing a plurality of filter threshold values based on said updated gain information.

6. The image processing system of claim 1, wherein said converter comprises:
a lookup table storing a plurality of noise characteristic estimates based on said updated gain information; and
a threshold circuit which multiplies a selected one of said plurality of noise characteristic estimates provided from said lookup table by a multiple based on a subband size to provide said filter threshold.

7. The image processing system of claim 1, wherein said converter comprises an arithmetic calculation circuit which converts said updated gain information into a total gain, and which converts said total gain into a noise characteristic estimate.

8. The image processing system of claim 1, wherein said filter comprises a wavelet-based denoising filter.

9. The image processing system of claim 1, wherein said filter comprises:
a forward discrete wavelet transform filter having an input receiving said second image information and an output providing wavelet values;
a threshold circuit having a first input receiving said wavelet values, a second input receiving said filter threshold, and an output providing adjusted wavelet values; and
an inverse discrete wavelet transform filter having an input receiving said adjusted wavelet values and an output providing said filtered image information.

10. The image processing system of claim 9, wherein said threshold circuit replaces each wavelet value that is less than said filter threshold with a zero value coefficient.

11. A method of processing image information, comprising:
processing first image information amplified using first gain information into second image information;
during said processing, determining second gain information from the first image information;
updating the first gain information using the second gain information and providing updated gain information;
converting the updated gain information into a filter threshold; and
filtering the second image information using the filter threshold to provide filtered image information.

12. The method of claim 11, wherein said determining second gain information comprises determining analog gain information and digital gain information.

13. The method of claim 11, wherein said determining second gain information comprises:
determining color component statistics from the first image information;
determining luminance information from the first image information;
determining light intensity information from the luminance information; and
determining the second gain information from the color component statistics and the light intensity information.

14. The method of claim 11, further comprising:
selecting the filtered image information when the updated gain information indicates an illumination level below a predetermined illumination threshold; and
selecting the second image information when the updated gain information indicates an illumination level above the predetermined threshold.

15. The method of claim 11, wherein said converting comprises providing the updated gain information to a lookup table storing a plurality of filter thresholds.

16. The method of claim 11, wherein said converting comprises:
providing the updated gain information to a lookup table storing a plurality of gamma values; and
determining the filter threshold based on a selected gamma value and a subband size.

17. The method of claim 11, wherein said converting the updated gain information comprises determining a total gain value from the updated gain information and converting the total gain value into a gamma value.

18. The method of claim 11, wherein said filtering comprises:
transforming the second image information into wavelet values;
replacing wavelet values that are less than the filter threshold with a zero value and otherwise passing the wavelet values to provide adjusted wavelet values; and
transforming the adjusted wavelet values into the filtered image information.

19. An image processing system, comprising:
an image sensor providing raw image information;

gain circuitry which amplifies and digitizes said raw image information to provide gain adjusted image information using first gain information;

an image processor which processes said gain adjusted image information into processed image information, and which extracts second gain information from said gain adjusted image information, and which updates said first am information using said second gain information and provides updated gain information;

a converter which converts said updated gain information into a filter threshold; and a denoising filter which filters said processed image information using said filter threshold to provide filtered image information.

20. A method of processing image information, comprising:

processing first image information into second image information;

during said processing, determining gain information from the first image information;

converting the gain information into a filter threshold;

filtering the second image information using the filter threshold to provide filtered image information;

selecting the filtered image information when the gain information indicates an illumination level below a predetermined illumination threshold; and selecting the second image information when the gain information indicates an illumination level above the predetermined threshold.

* * * * *